(12) United States Patent
Bate

(10) Patent No.: US 12,144,461 B2
(45) Date of Patent: Nov. 19, 2024

(54) AUTOMATED OVEN APPLIANCE FOR BAKING AND BROILING FOOD

(71) Applicant: Stephen Bate, Fitchburg, MA (US)

(72) Inventor: Stephen Bate, Fitchburg, MA (US)

( * ) Notice: Subject to any disclaimer, the term of this patent is extended or adjusted under 35 U.S.C. 154(b) by 274 days.

(21) Appl. No.: 17/660,521

(22) Filed: Apr. 25, 2022

(65) Prior Publication Data

US 2022/0257053 A1 Aug. 18, 2022

Related U.S. Application Data

(62) Division of application No. 16/108,999, filed on Aug. 22, 2018, now abandoned.

(51) Int. Cl.
*A47J 36/32* (2006.01)
*A47J 37/06* (2006.01)
*F24C 7/08* (2006.01)

(52) U.S. Cl.
CPC ........... *A47J 36/32* (2013.01); *A47J 37/0629* (2013.01); *F24C 7/085* (2013.01)

(58) Field of Classification Search
CPC ........ A47J 36/32; A47J 37/0629; F24C 7/085
See application file for complete search history.

(56) References Cited

U.S. PATENT DOCUMENTS

| | | | |
|---|---|---|---|
| 3,560,711 A | 2/1971 | Manecke | |
| 3,633,491 A | 1/1972 | Williams, Jr. et al. | |
| 3,691,937 A | 9/1972 | Meek et al. | |
| 4,114,523 A * | 9/1978 | Eff | A47J 37/041 99/393 |
| 5,429,043 A | 7/1995 | Becker | |
| 5,938,959 A | 8/1999 | Wang | |
| 9,097,429 B2 * | 8/2015 | Nam | F24C 15/16 |
| 9,445,614 B2 | 9/2016 | Storek et al. | |

* cited by examiner

*Primary Examiner* — Steven N Leff
(74) *Attorney, Agent, or Firm* — Jerome Drabiak; Edison Law Group

(57) ABSTRACT

An improved automated oven appliance for baking or broiling food in a cooking chamber is disclosed. The appliance includes two heating elements, one or more food baskets, a baking pan, a temperature sensor, a cooking chamber, a user interface panel, a micro controller and two motors located within a metal cabinet. Food cooking methods stored in memory in a micro controller determines cooking chamber temperature and cooking intervals, as well as movement of one of the food baskets in the cooking chamber. Intervals of rotary motion of a food basket in the cooking chamber as part of a cooking method and ultimate shut down of the appliance after food is cooked is controlled by the memory of the micro controller.

7 Claims, 7 Drawing Sheets

AUTOMATED OVEN APPLIANCE FOR BAKING AND BROILING FOOD

REFERENCE TO RELATED APPLICATIONS

The present utility patent application is a divisional of U.S. application Ser. No. 16/108,999 filed on Aug. 22, 2018, and published on Feb. 27, 2020, as US publication 2020/0060470, which is hereby incorporated by reference in its entirety for purposes of priority pursuant to title 35, US Code, sections 120 and 121.

FIELD

The solution to current cooking problems, according to embodiments of the invention, generally relate to household and professional electric or gas appliances used for baking, roasting or broiling. More particularly, the solution relates to a new method of spicing, for example meat or fish, during baking, roasting, or broiling. Even more particularly, the solution relates to an automated appliance for baking, roasting, or broiling meat or fish disposed in the cooking chamber of the appliance.

BACKGROUND

Current household and professional baking, roasting, or broiling appliances generally include a cabinet providing a cooking chamber, in which a food item is placed for baking, roasting, or broiling. Heating elements are positioned within the cooking chamber to provide heat to cook food items therein. The heating elements may include baking/roasting elements at the bottom, and broiling elements at the top, of a cooking chamber. An appliance may also include: a convection fan used to circulate air within the cooking chamber; shelves for placing food to be cooked; and knobs to select the type of cooking that is desired, for example, baking, or broiling.

During baking, roasting, or broiling operations, the food could be spiced and placed in a baking pan and, subsequently placed on one of the shelves in a cooking chamber. A cooking knob can be activated after a cooking chamber door is closed.

Baking operations may, e.g., energize baking elements for heating a bottom portion of a cooking chamber. Temperature selection and duration of heat transfer within cooking chambers is based on manufacturer-programmed cooking methods.

At some point during the baking process, spiced juice in the case of spiced food, or juice from the food in the case of un-spiced food, could be added or will collect at the bottom of a baking pan in which the food is placed. The food can be meat, fish, or other food items that produce liquid when heated. When such liquid collects, the bottom side of the food, submerged in such liquid, will be less cooked compared to the upper side of the food. To make sure that both sides are cooked completely, the oven appliance user will typically open the cooking chamber and manually turn the sides of each piece of food in the baking pan and close the door for baking/roasting or broiling to resume. This process is repeated by a user, at various intervals, until the baking/roasting, or broiling, of the food is completed to the satisfaction of a user. For instance, a user may periodically taste the food while it is cooking or use a food thermometer to be convinced that the food is cooked to a desired taste of the user. It should be noted in certain cases, depending on the food, the amount of heat produced during cooking, and the duration of heat in the cooking chamber, that it may become necessary to add additional spiced liquid, or water in the case of un-spiced food, into the baking pan containing the food, to ensure food does not burn as a result of inadequate moisture on the food surface.

Accordingly, an improved oven appliance for baking, roasting, or broiling food, comprising a cooking chamber defining an interior region and at least two heating elements within the cooking chamber, with one of two heating elements being located at a bottom portion of the cooking chamber and the other of the heating elements being located at a top portion of the cooking chamber, is desired.

SUMMARY

The present subject matter provides an improved oven appliance for baking, roasting, or broiling food. The oven appliance includes a cooking chamber that has an interior region and at least two heating elements in the cooking chamber. One of the heating elements, located at a bottom portion of the cooking chamber, is used for baking or roasting food. The other of the heating elements, located at a top portion of the cooking chamber, is used for broiling food. The oven appliance includes a temperature sensor in the cooking chamber to determine a temperature within the cooking chamber, a baking pan in the cooking chamber, and a food basket in the baking pan. The oven appliance also includes a temperature control mechanism for causing one of the heating elements to maintain a predetermined temperature within the cooking chamber for a predetermined amount of time. The improvement comprises: at least two motors operatively associated with the food basket, and a first mechanism which I call a pause heat-and-vertical lift control means configured and adapted for causing one of the two heating elements associated with maintaining the predetermined temperature to be turned off after the predetermined amount of time has passed and for causing one of the two motors to move the food basket vertically upward from the baking pan into the interior region toward the top portion of the cooking chamber. The improvement further comprises a second mechanism which I call a fluid addition control means configured and adapted for adding to the baking pan a predetermined amount of either water or a liquid preparation, either of which includes or does not include a predetermined amount of preselected spices. The improvement further comprises a third mechanism which I call a food rotation control means configured and adapted for causing the other one of the two motors to rotate the food basket about an axis that is oriented transverse to the vertical movement of the food basket by about 180 degrees after the food basket has been moved vertically upward into the interior region. The improvement further comprises a fourth mechanism which I call a basket descent control means configured and adapted for causing said one of the motors to move the food basket down vertically from the interior region toward the baking pan after the fluid addition means has provided to the baking pan the predetermined amount of said water or liquid preparation.

In one exemplary embodiment consisting of two or more food baskets on two planes, a user places food, e.g., meat or chicken in the food baskets and subsequently in the baking pan. When an appropriate knob is activated, the heating element below the baking pan produces heat in the case of baking/roasting or the upper heating element produces heat in the case of broiling. Heat fluctuation, duration of heat fluctuation, and movements of a food basket within the cooking chamber is based on predefined control of electromechanical devices responsible for movements of each of the two or more food baskets in the cooking chamber.

When a user activates such knob, one of the heating elements produces heat in the cooking chamber. After a predetermined amount of time, two food baskets (in the case that uses two food baskets) are positioned horizontally and separated by a horizontally oriented support. The two food baskets will first be transferred upwardly from the baking pan. Their vertical transfer will be followed by the rotation of the food baskets about an axis, which will finally be followed by vertically lowering the two food baskets back into the baking pan, due to operation of an electromechanical mechanism by a controller. This action ensures that the first food basket, initially inside the baking pan, is now removed from the pan, and that the second food basket is now in the baking pan. Such vertical up-and-down motion and 180 degree rotation of a food basket, mimics manual tasks performed by users of conventional oven appliances during baking/roasting or broiling food. An object of the improved oven appliance of the present subject matter is to ensure that food cooks evenly and is kept moist, or continuously spiced, in the baking pan.

In another exemplary embodiment consisting of one or more food baskets on the same plane, a user places food, e.g., meat or chicken in the two food baskets and subsequently places the baskets in the baking pan. When an appropriate knob is activated, the heating elements below the baking pan will produce heat in the case of baking/roasting and the upper heating elements will produce heat in the case of broiling. Heat fluctuation, duration of heat fluctuation, and movements of the one or more food baskets within the cooking chamber are based upon control of electromechanical mechanisms responsible for movement of food baskets in the cooking chamber. When the user activates such knob, one of the heating elements will produce heat in the cooking chamber. After a predetermined amount of time, a food basket oriented horizontally will first be raised up from the baking pan. Next, the raised-up food basket will be rotated about an axis and lowered back into the baking pan, as a result of the operation of an electromechanical mechanism. This action ensures that food items in the food basket that had been immersed in the fluid in the baking pan have now been rotated 180 degrees while the other surface of the food item will next be immersed in the fluid in the baking pan. Such vertical up-and-down motion and 180-degree rotation of a food basket, mimics manual tasks performed by users of conventional oven appliances during baking/roasting or broiling food. Another object of the improved oven appliance of the present subject matter is to ensure food is at desired moisture or spice levels in baking pans.

Still another embodiment of the improved oven appliance of the present subject matter includes a first mechanism which includes a receptacle to manually, or automatically, add desired liquids and spices to the baking pan and a second mechanism to automatically remove liquid from the baking pan, if needed. Such mechanisms can be included within an improved oven appliance described above.

Yet another embodiment of the improved oven appliance could include a mechanism to measure food temperature and turn off heat when predetermined temperatures are reached, for ensuring that that food is cooked to a user's tastes.

The above noted features, and other features and advantages of the present subject matter will be better understood with reference to the detailed description and accompanying drawings. The accompanying drawings constitute a part of this patent application that illustrates embodiments of the present subject matter.

BRIEF DESCRIPTION OF THE DRAWINGS

The present subject matter—my invention—shall be better understood after reviewing the following detailed description and associated drawing figures.

DETAILED DESCRIPTION

Figure 1:
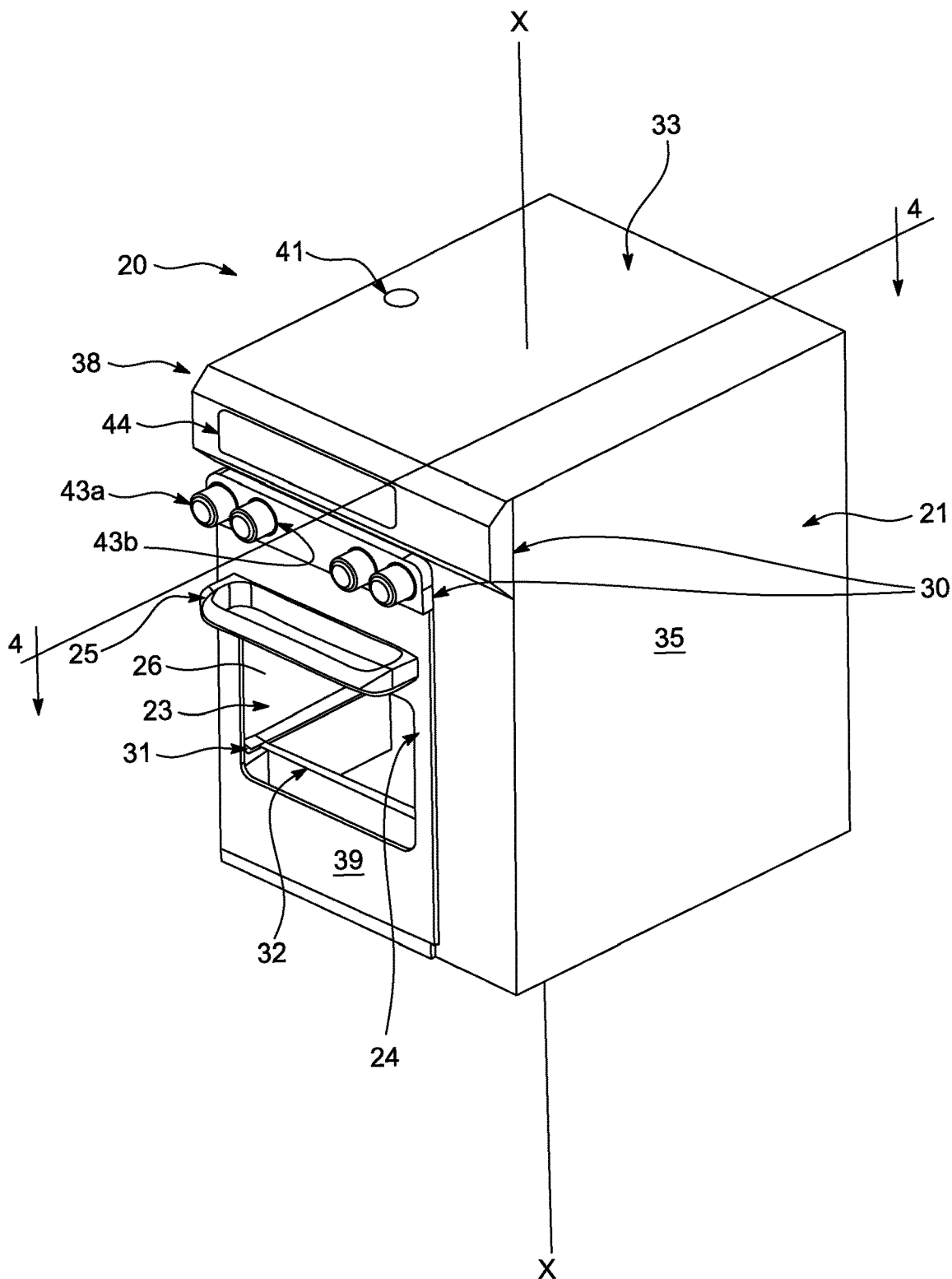
FIGS. 1 and 2 present two perspective views of an exemplary embodiment of an improved oven appliance in accordance with the present subject matter.
Figure 2:
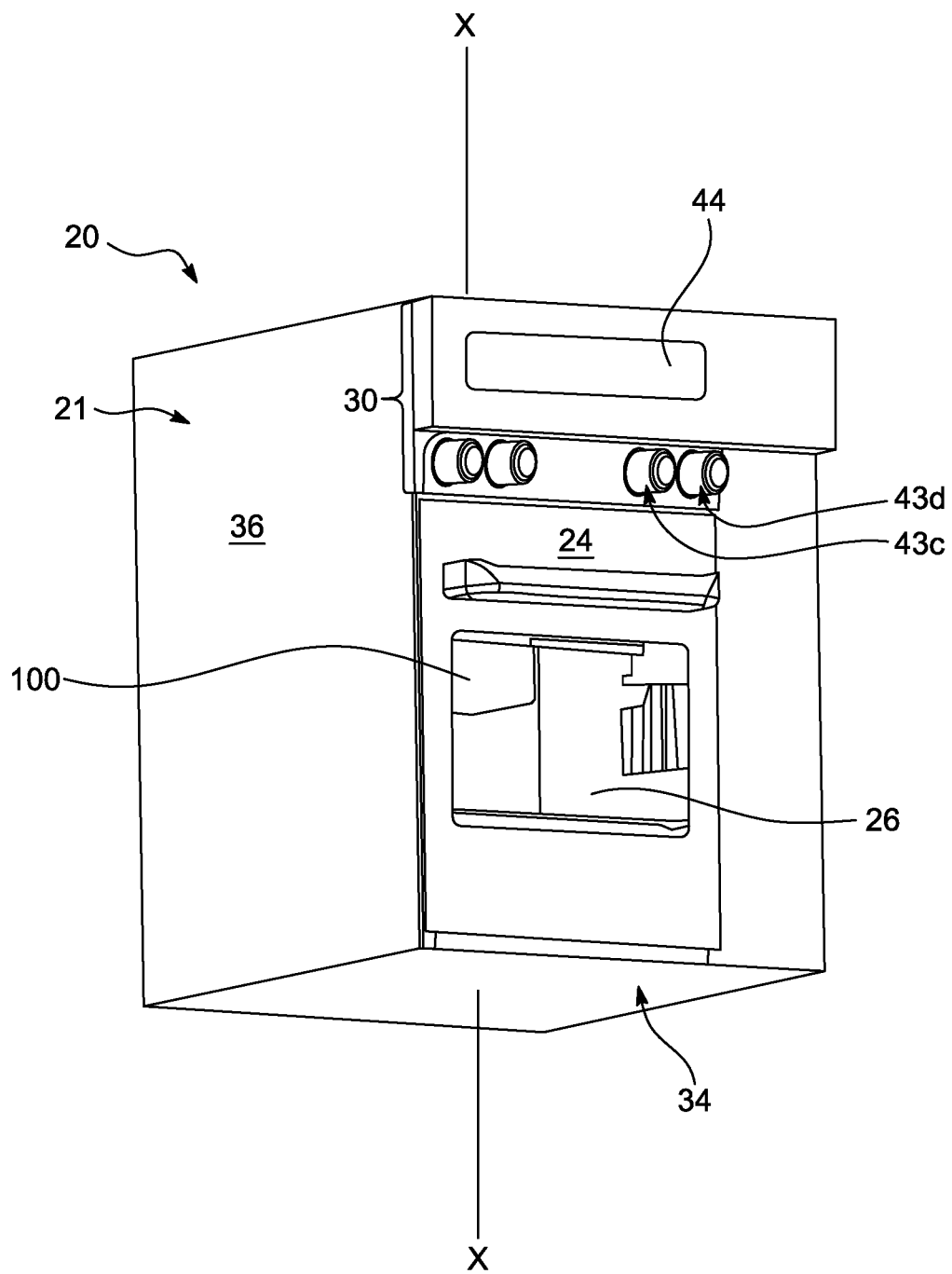

Reference to the drawings shall now be made to better understand the detailed description. Fla 1 presents a perspective view of an oven appliance 20 in accordance with the present subject matter. In this exemplary embodiment, a free standing household oven appliance 20, embodying the principles of the present subject matter, is used for baking, roasting, broiling, or grilling food such as meat or fish as an example. The oven appliance 20 could be powered by a gas or electric heat source to cook the food; however, if gas is used, electricity may still be needed to power certain electromechanical devices, components, and/or mechanisms. Also, description of the present subject matter, moving forward, shall be focused upon an improved oven appliance powered, e.g., by electricity as a heating source. Yet, this detailed description, providing one or more examples of the present subject matter, shall by no means serve as a limitation. It shall be clear to one of ordinary skill in this field that many variations and modifications can be made to this disclosure without changing the principles and scope of the present subject matter. As an example, all functions, components, mechanisms, and/or features described in this specification, as part of one embodiment, can be combined and/or used in conjunction with another embodiment, to create yet another embodiment. It should now be clear that the present disclosure covers all such variations and/or modifications insofar as they fall within the spirit and scope of the appended claims.

The oven appliance 20 (FIGS. 1-4 and 6) and its components (FIG. 5) include, amongst other components, an outer cabinet 21 which contains an inner cabinet 22 having substantially the same geometrical shape as the outer cabinet 21 (FIG. 3) and, a cooking chamber 23 within the interior of the inner cabinet 22. The inner cabinet 22 provides a heat-transfer resistant and well-insulated enclosure that serves primarily the purpose of preventing heat dissipation from the cooking chamber 23 to the space between the inner cabinet 22 and the outer cabinet 21 where, electromechanical devices, components and/or mechanisms are installed. The oven appliance 20 includes a door 24 (FIG. 1) mounted to the outer cabinet 21 using conventional hardware, e.g. hinges (not shown) and a handle 25 mounted to the door 24.

Figure 4:
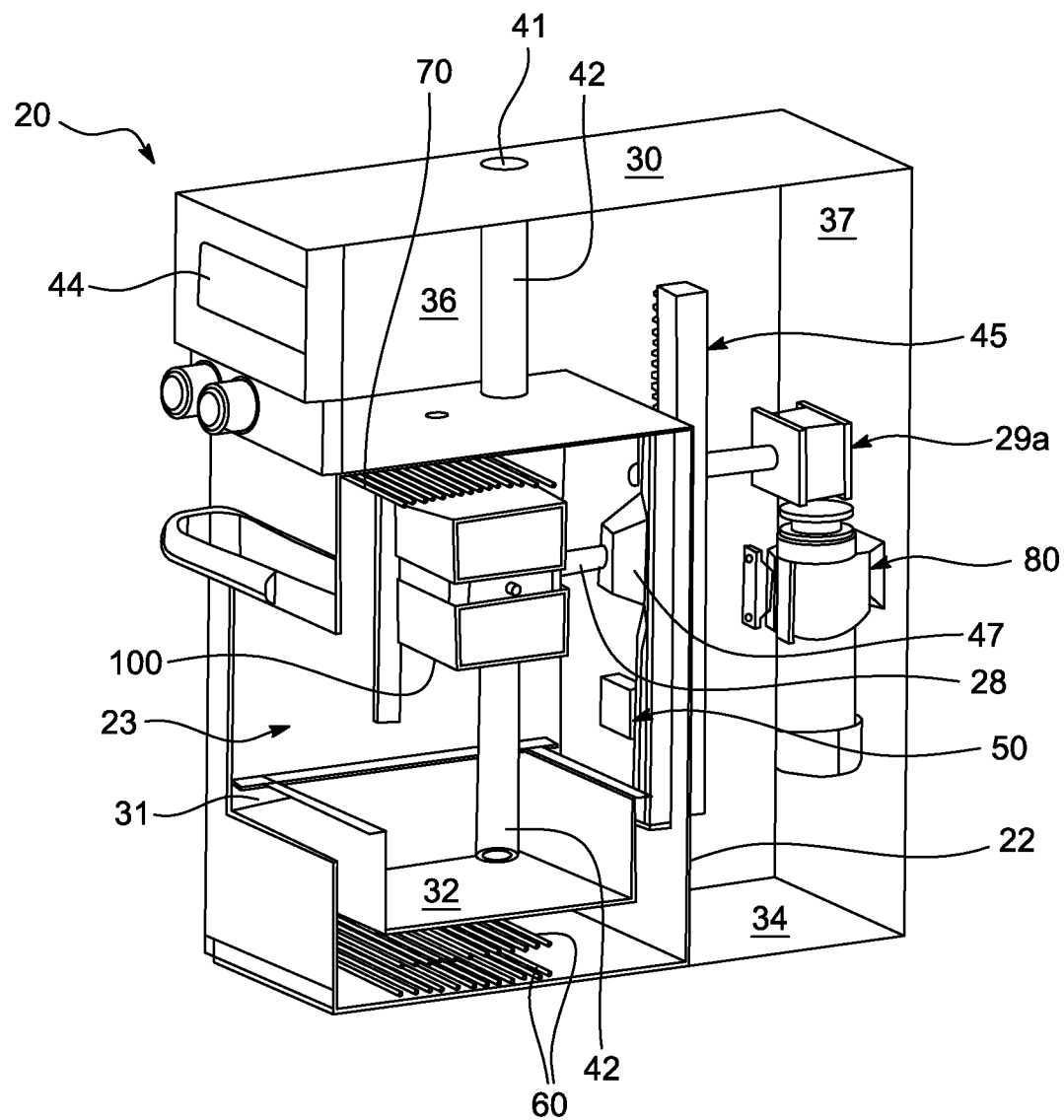
FIG. 4 is a perspective, side elevational view, taken along line 4-4 in FIG. 1.

A user opens or closes the door 24 by using the handle 25 to access the cooking chamber 23 (FIGS. 1, 4). Pulling handle 25 opens the cooking chamber 23 and pushing the handle 25 toward the cooking chamber 23 closes the door 24.

Figure 5:
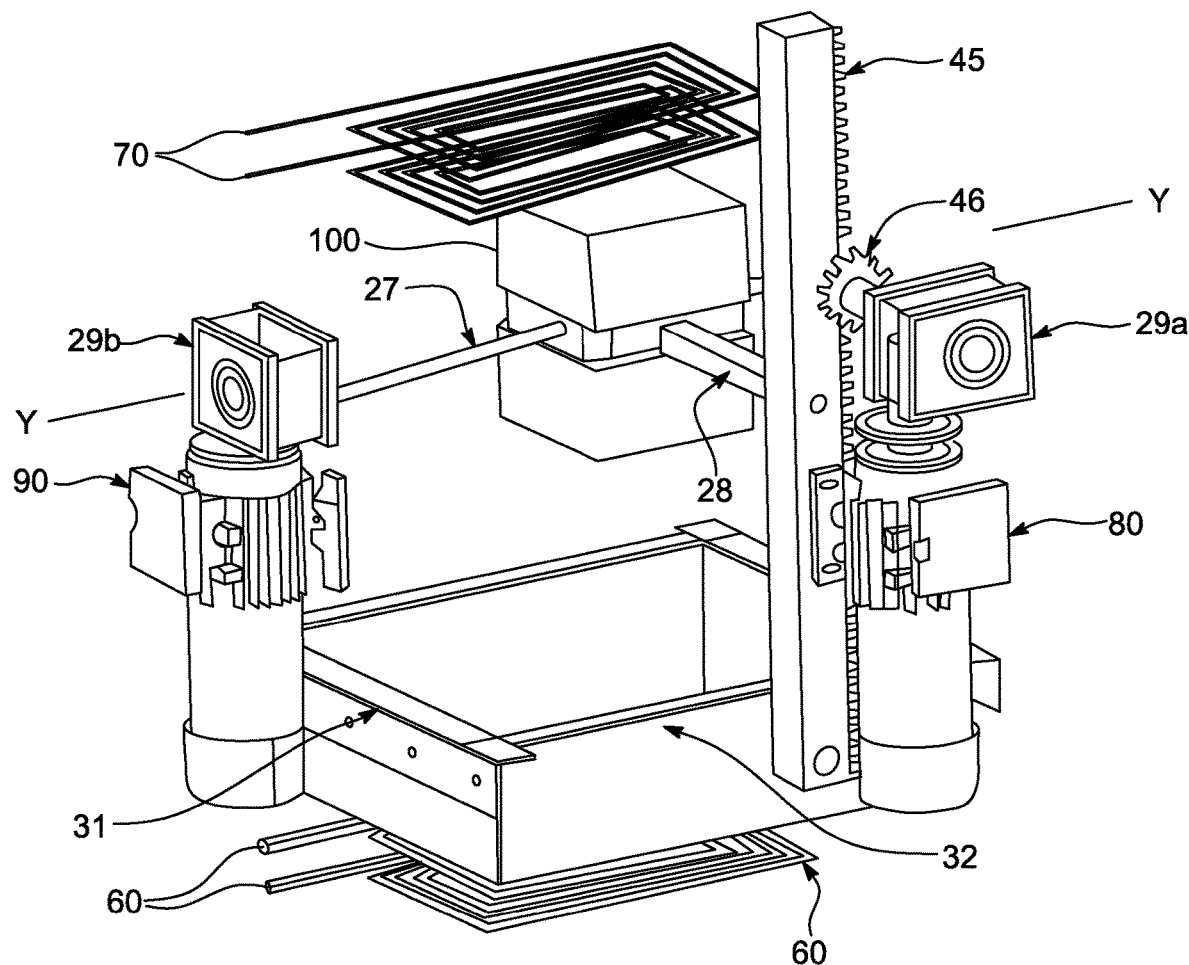
FIG. 5 is exploded view of key components of the improved oven appliance.

The oven appliance 20 further includes seals (not shown in the figures) between the door 24 and the cooking chamber 23 with the sole purpose of ensuring that heat does not escape, and fumes do not dissipate, from cooking chamber 23. In addition, the door 24 has two (inner and outer) glass panels 26 for viewing food in the cooking chamber 23 when door 24 is closed. One or more food baskets 100 (FIG. 4) are positioned in cooking chamber 23 for receipt of food items to be baked, roasted, or broiled as an example. The food basket 100, attached to a horizontal spindle 27 and food basket support 28 (FIG. 5), are connected to a first motor 80 and a second motor 90 for achieving vertical and rotary motion of food basket 100 using geared mechanisms 29a, 29b (FIG. 5). A baking pan support 31 is also situated at the lower part of the cooking chamber 23 onto which a baking pan 32 is located.

Figure 3:
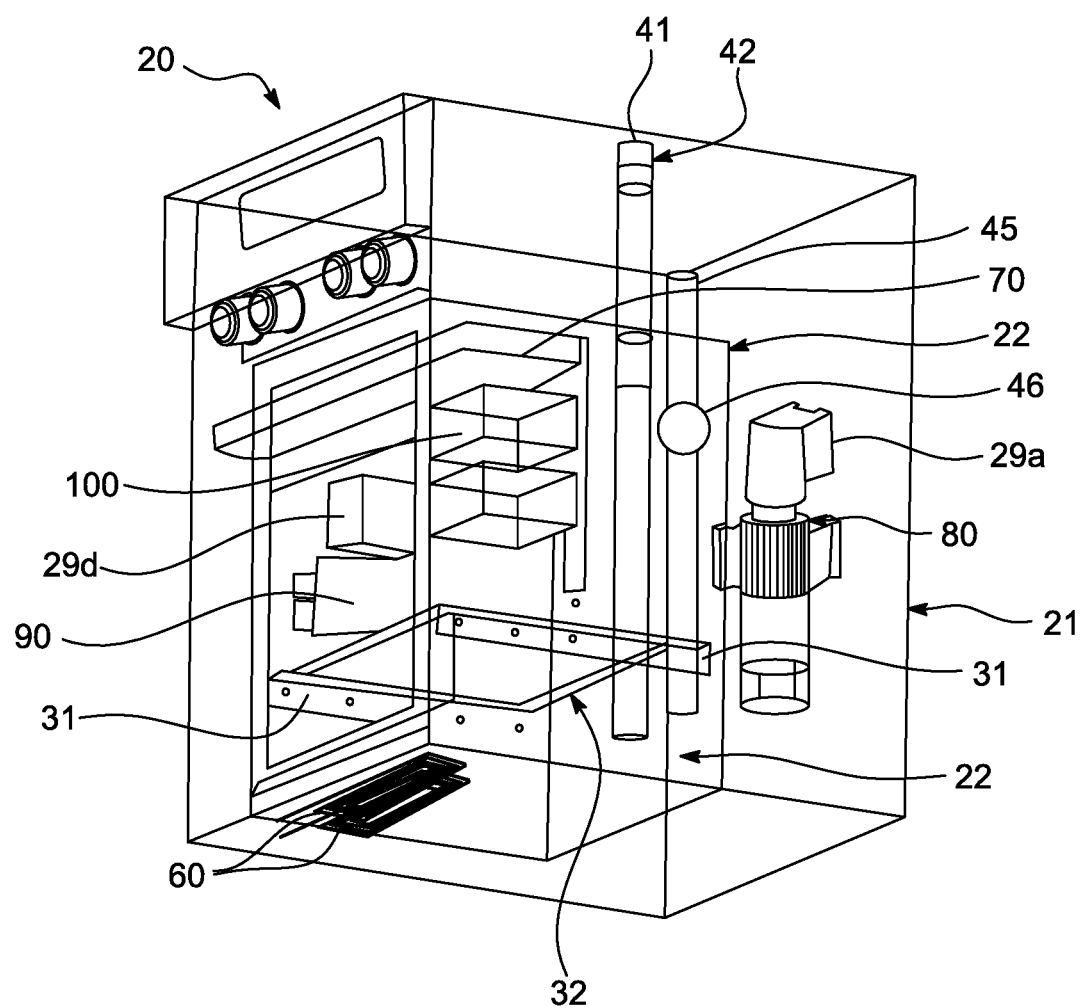
FIG. 3 is a rear perspective view presenting certain internal components of the exemplary embodiment of the improved oven appliance shown in FIGS. 1, 2.

Two lower heating elements 60 and two upper heating elements 70 are included within oven appliance 20, all located (FIG. 4) within cooking chamber 23. In an exemplary embodiment, as illustrated in FIGS. 3 and 5, one pair of heating elements 60 are located toward a lower portion of the cooking chamber 23. This pair of bottom heating elements 60 are used for baking and roasting. The other pair of heating elements 70, which are located toward an upper portion of the cooking chamber 23, are used for broiling food that is contained within the food basket 100.

The oven appliance 20 includes a top wall 33 (FIG. 1) and a bottom wall 34 (FIG. 2) spaced apart and perpendicular to a vertical axis X-X. A first side wall 35 (FIG. 1) and a second side wall 36 (FIG. 2) are laterally spaced apart. There is also a back wall 37 (FIG. 4) that extends between the top wall 33 and the bottom wall 34 and between the first side wall 35 and the second side wall 36. The oven appliance 20 includes a front wall 38 consisting of a cooking chamber door 39. These six sides contain the inner cabinet 22 and the cooking chamber 23. The oven appliance 20 further includes a liquid inlet 41 (FIG. 1) connected to a hollow tube 42 (FIG. 4) for conveying liquid into the baking pan 32 if need be. The inlet 41 is provided at the top part of the oven appliance 20. The liquid ensures additional liquid or spices are added to baking pan 32, to provide additional moisture or spices to cooked food, as a result of vertical and rotary motion, described in detail below, during cooking of food. A cover (not shown) can be positioned over the liquid inlet 41 to prevent heat within the cooking chamber 23 from escaping during food cooking operation.

The oven appliance 20 is also equipped with a micro controller 40 (FIG. 6) to regulate operation of oven appliance 20 and control movement of food basket 100 as well as regulate heat produced by the heating elements 60, 70. During operation, the micro controller 40 communicates with all components of oven appliance 20 and, based upon predefined algorithms, controls when and how each component is to operate. Micro controller 40 includes a microprocessor and a memory device including, e.g., a random access memory, a DRAM, a read-only memory, and/or a ROM or FLASH device, in which preprogrammed operational algorithms are stored.

The micro controller 40, located inside user interface panel 30 (FIGS. 1, 2), communicates with electromechanical devices and other components (FIG. 6) of oven appliance 20 through conventional wired connections. User interface panel 30 includes such operational components as knobs 43a, 43b, 43c, 43d and a display screen 44 (FIG. 1) to provide user feedback during operation of oven appliance 20.

Micro controller 40 communicates with a heat sensor 50 (FIG. 6) located at back wall 37 (FIG. 4) of oven appliance 20. Heat sensor 50 can be a thermocouple or another device used to measure temperature within the cooking chamber 23 of the oven appliance 20. Although, in this exemplary embodiment, heat sensor 50 is located on the back wall of the inner cabinet 22 (FIG. 4) within cooking chamber 23, it can be placed in any other preferred location within the cooking chamber 23. The heat sensor 50 controls when heat is to be produced by the heating elements 60, 70 within the cooking chamber 23. Such control is based upon preprogrammed algorithms stored within the micro controller 40 memory device depending on user selected operation. The oven appliance 20 cooking chamber 23 temperatures are, in turn, shown to the user via the display screen 44 on the user interface panel 30.

Figure 6:
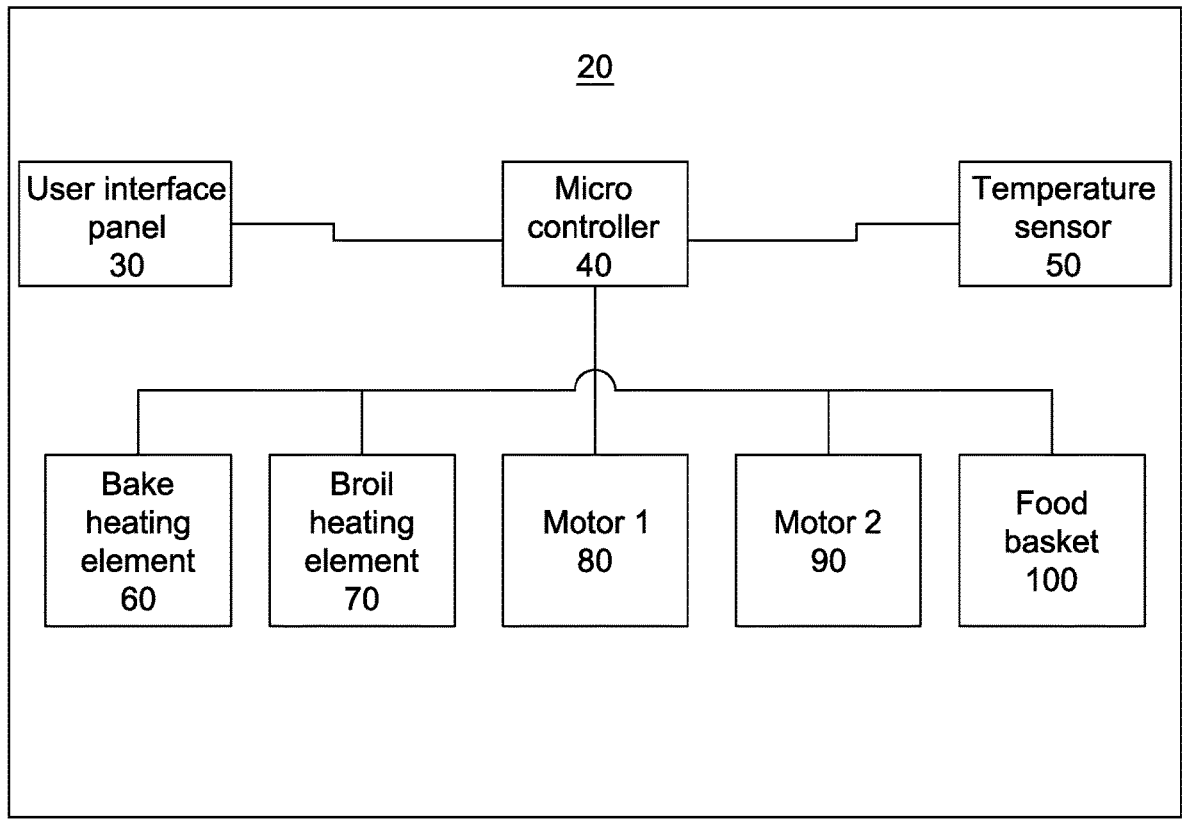
FIG. 6 is a schematic of certain components of the improved oven appliance.

FIG. 6 is a schematic diagram of key operational components of the oven appliance 20 of the present subject matter. As depicted in the schematic diagram, the micro controller 40 is in communication with the user interface panel 30 and the heat or temperature sensor 50 at a high level. When a user selects a desired operation at the user interface panel 30, operation is registered by micro controller 40. The micro controller 40, in turn, transmits the user selected operation to the other components shown in FIG. 6 for action based on preprogrammed logic stored in micro controller 40 memory. For example, if the selected operation by the user is to bake food, the micro controller 40 will communicate with the bake heating element 60, the first motor 80, and the second motor 90 to initiate heat for baking while the first and second motors 80 and 90 will operate to exert vertical and rotary motion, as needed, upon the food basket 100, in accordance with preprogrammed logic stored in micro controller 40 memory. During operation, temperature control feedback is monitored by the heat or temperature sensor 50 and transmitted to the micro controller 40. In, for example, the case where the user selects a broiling operation on user interface panel 30, the user interface panel 30 will communicate that selection to the micro controller 40 which, in turn, communicates with broil heating element 70 to produce suitable heat energy. Thereafter, such components as the first and second motors 80, 90 and the food basket 100 and heat sensor 50 will perform operations resembling the case (above) where a user selected a baking operation on user interface panel 30 to trigger use of the bake heating element 60. The present disclosure relates specifically to the operation of the first and second motors 80 and 90, and associated automated motion of the food basket 100, to replace manual processes performed by a user when baking, roasting, or broiling such food items as meat or fish in a household or professional oven appliance 20.

Figure 7:
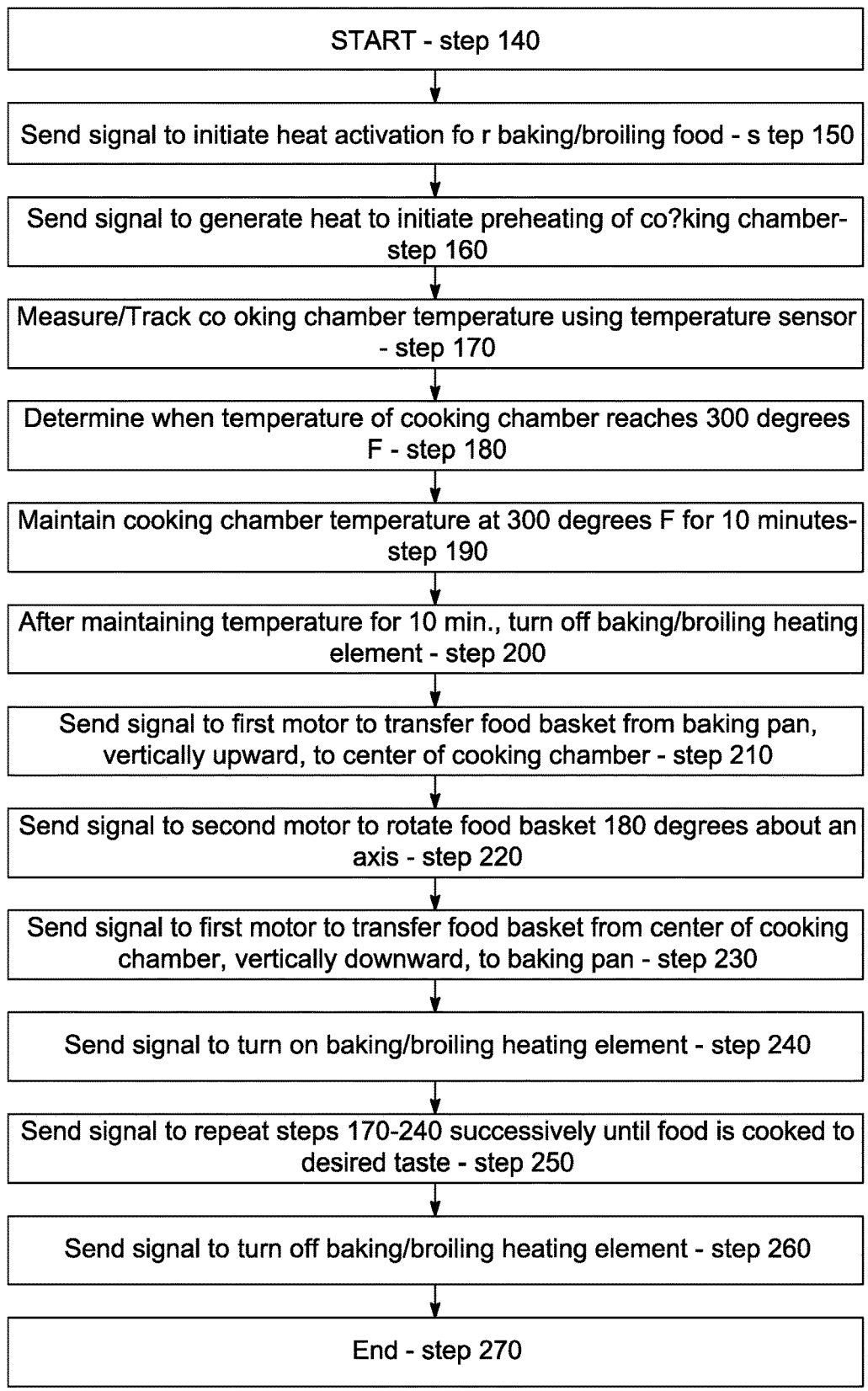
FIG. 7 is a process that illustrates operation of the improved oven appliance.

Now that the components, the construction, and the programming of oven appliance 20 have been described in accordance with the exemplary illustrated embodiments, I shall next describe an exemplary operational method, comprising several steps (as shown in FIG. 7), for using the oven appliance 20 to bake or broil food. It can be appreciated that the operational method (FIG. 7) can also be used to roast or grill food as well, beginning with step 140, to START oven appliance 20.

After initiating step 140, to START oven appliance 20, in the case where the user wishes to bake in the oven appliance 20, a user will activate a baking knob 43a, which initiates heat activation for baking or broiling food, step 150, using the bake heating element 60 in cooking chamber 23. Heat generated by the bake heating element 60 initiates preheating of cooking chamber 23, step 160, during which time measuring and tracking the cooking chamber temperature, step 170, begins. When the cooking chamber temperature reaches 300 degrees Fahrenheit, step 180, the cooking chamber temperature will be maintained for 10 minutes, step 190, after which the baking heating element 60 is turned off, step 200, by the system, FIG. 6, based on pre-programmed logic stored in the micro controller 40. With the baking heating element 60 off, an output of the first motor 80 will rotate through a rack 45, pinion 46 and a gear assembly 29a coupled to the output of the first motor 80 (FIG. 5), the rotary motion will be translated into linear motion, namely, vertically upward motion. This motion will transfer the food basket 100 vertically upward, step 210, from the baking pan to the center of the cooking chamber 23 due to, an output shaft of first motor 80 being coupled to a geared assembly or mechanism 29a which, in turn, is coupled to a vertically-oriented rack 45, via a pinion gear 46, for raising and lowering food basket 100 relative to baking pan 32 along axis it should be noted that the use of the rack 45 and pinion 46 is by way of example since various other mechanisms known in the art can be used to translate/convert rotary motion to linear motion. After food basket 100 is moved vertically upwards, step 210, and after first motor 80 has stopped, the micro controller 40 cause an actuator 47 to de-couple the food basket support 28 from the food basket 100, for enabling an output shaft of the second motor 90, coupled to a second geared assembly or mechanism 29b, will perform a 180-degree rotation of food basket 100 about an axis Y-Y by rotating spindle 27 about axis Y-Y, step 220. After the second motor 90 performs a complete 180-degree rotation of food basket 100 about the axis Y-Y, micro controller 40 will cause actuator 47 to re-couple the food basket support 28 to food basket 100, the micro controller 40 will cause the mechanism 29b to de-couple spindle 27 from food basket 100, and first motor 80 will initiate a vertically downward motion of food basket 100 into baking pan, step 230. This vertically downward motion of food basket 100, step 230, uses the same mechanisms as step 210, the only difference being that, in step 230, first motor 80 rotates its output shaft in a direction opposite a direction used to achieve step 210.

When the food basket 100 is lowered into the baking pan 32, step 230, the system (FIG. 6) again turns on (energizes) the baking heating element 60, step 240, and subsequently, repeats steps 170 through 240, successively until food is cooked, to taste, step 250. The system will then turn off the baking heating element 60, step 260, and check to be sure that step 260 is achieved. If achieved, the system then ends the operation and turns itself off, step 270. The user may now open the oven appliance door 24 and remove food from the food basket 100 within the cooking chamber 23. It should be noted that the steps described herein (FIG. 7) can also be undertaken to broil food placed in food basket 100, provided that broil heating element 70 is used in step 150, with all other steps being the same as the case of baking. Furthermore, in all types of cooking performed in connection with the present subject matter, steps 160, 180, and 190, as well as the overall length of time it takes to complete steps 150 through 260, will depend upon the sorts of food products that are to be baked or broiled, to taste. Hence, the exact temperature, including the heat duration, and the cooking duration for each food product will be determined during a subjective process involving taste testing. Further in that regard, operational testing may involve a desired oven appliance configuration to achieve a desired cooking result. For example, operational testing may enable one to find that the oven appliance 20 needs to have at least two cooking chambers 23, so that each is dedicated to a particular type of food during its cooking operation. Or, operational testing may determine that certain parameters controlled by the micro controller 40 need to be revised to cook a variety of food types in one cooking chamber 23. Any variation in configuration of systems comprising mechanical or other operational components, devices, and accessories, including the design and operational control of such systems, stemming from the present subject matter, be it during testing or otherwise, is part of the new oven appliance 20 disclosed herein.

Now that a system configuration, including its design and control, for illustrated embodiment of the present subject matter has been described in detail, its power requirements shall next be reviewed. It is believed various embodiments of an oven appliance of the present subject matter will be powered by 120 or 240 volts of electricity mainly to power their heating elements. However, since not all components of such an oven appliance will operate on either of these voltages, a voltage regulator, many of which are well known in the art, may be used to step down a voltage to an appropriate voltage for components of the oven appliance.

I claim:
1. An improved oven appliance for baking, roasting, or broiling food, wherein the oven appliance includes:
    a cooking chamber defining an interior region;
    at least two heating elements in the cooking chamber, wherein one of the at least two heating elements is located adjacent to a lower portion of the cooking chamber and is used for baking or roasting food, and wherein the other of the at least two heating elements is located adjacent to an upper portion of the cooking chamber and is used for broiling food;
    a temperature sensor for determining a temperature within the cooking chamber;
    a baking pan located within the lower portion of the cooking chamber;
    a food basket disposed within the cooking chamber; and
    a controller means adapted and configured for causing said one of the at least two heating elements to maintain a predetermined temperature in the cooking chamber for a first predetermined period of time;
  wherein the improvement comprises:
    at least two motors operatively associated with the food basket;
    wherein the controller means is further adapted and configured for causing said one of the at least two heating elements associated with heating the lower portion of the cooking chamber to be turned off when the first predetermined period of time has passed and the food basket is moved from the baking pan;
    wherein the controller means is further adapted and configured for causing one of the at least two motors to move the food basket from the baking pan vertically upward along a first axis from a first position located adjacent to the lower portion of the cooking chamber to a second position located near the upper portion of the cooking chamber for broiling the food;
    wherein the controller means is further adapted and configured for causing the other one of the at least two heating elements to be turned on for a second predetermined period of time to broil food in the food basket after said one of the at least two motors has moved the food basket to the second position; and wherein the controller means is further adapted and configured for causing the other one of the at least two motors to rotate the food basket for the second predetermined period of time about a second axis disposed transverse to the first axis after the food basket has been moved from the pan along the first axis from the first position to the second position.

2. The improved oven appliance of claim 1, wherein the improvement further comprises:

wherein the controller means is further adapted and configured for causing said one of the two motors to move the food basket vertically downward along the first axis from the second position at the upper portion of the cooking chamber to the first position at the lower portion of the cooking chamber and into the baking pan when the second predetermined period of time has passed and the other one of the at least two heating elements has been turned off.

3. The improved oven appliance of claim 2, wherein the controller means is further adapted and configured for causing said one of the at least two heating elements to again be turned on, to resume cooking the food in the food basket at the predetermined temperature after a predetermined amount of liquid preparation or water has been added to the baking pan and after said one of the two motors has moved the food basket from the second position to the first position within the cooking chamber and back into the baking pan, wherein the controller means is further adapted and configured for causing said one of the at least two heating elements to again maintain the predetermined temperature in the cooking chamber, and wherein the food in the food basket is further cooked in the baking pan in the lower portion of the cooking chamber at the predetermined temperature.

4. The improved oven appliance of claim 3, wherein the food in the food basket is cooked in the pan in the cooking chamber at the predetermined temperature until a third predetermined period of time has occurred.

5. The improved oven appliance of claim 4, wherein the predetermined temperature is about 300 degrees Fahrenheit, and wherein the first predetermined period of time is about 10 minutes.

6. The improved oven appliance of claim 4, wherein the third predetermined period of time occurs when the food is baked or broiled to a predetermined taste.

7. The improved oven appliance of claim 1, wherein the controller means is further adapted and configured for causing the other one of the at least two motors to rotate the food basket about 180 degrees about the second axis until the second predetermined period of time occurs.

* * * * *